United States Patent [19]
Hsu et al.

[11] Patent Number: 5,876,296
[45] Date of Patent: Mar. 2, 1999

[54] GEAR SHIFTING SPROCKET SET FOR BICYCLE CHAIN WHEEL

[75] Inventors: Pai-Hsiang Hsu, Tainan; Jung-Ping Chiang; Chang-Dau Yan, both of Taipei, all of Taiwan

[73] Assignee: Industrial Technology Research Institute, Taiwan, China

[21] Appl. No.: 866,319

[22] Filed: May 30, 1997

[30] Foreign Application Priority Data

Apr. 16, 1997 [TW] Taiwan ................................. 86205907

[51] Int. Cl.⁶ .................................................. F16H 55/12
[52] U.S. Cl. .......................... 474/160; 474/78; 474/80; 474/140; 474/152; 474/155; 474/164
[58] Field of Search ................................. 474/160, 162, 474/164, 155, 156, 157, 158, 140, 152, 78, 80

[56] References Cited

U.S. PATENT DOCUMENTS

| | | |
|---|---|---|
| 4,348,200 | 9/1982 | Terada ..................................... 474/160 |
| 4,738,653 | 4/1988 | Riewerts et al. ........................ 474/156 |
| 5,085,621 | 2/1992 | Nagano . |
| 5,087,226 | 2/1992 | Nagano . |
| 5,192,248 | 3/1993 | Nagano . |
| 5,192,249 | 3/1993 | Nagano ............................... 474/164 X |
| 5,273,495 | 12/1993 | Nagano ............................... 474/160 X |
| 5,413,534 | 5/1995 | Nagano . |
| 5,458,543 | 10/1995 | Kobayashi ............................. 474/160 |
| 5,464,373 | 11/1995 | Leng ..................................... 474/140 |
| 5,514,042 | 5/1996 | Liou ................................... 474/164 X |
| 5,545,096 | 8/1996 | Su ......................................... 474/160 |
| 5,609,536 | 3/1997 | Hsu ....................................... 474/160 |

*Primary Examiner*—Donald P. Walsh
*Assistant Examiner*—Emmanuel M. Marcelo
*Attorney, Agent, or Firm*—Finnegan, Henderson, Farabow, Garrett and Dunner, L.L.P.

[57] ABSTRACT

A bicycle sprocket set is composed of a small sprocket and a large sprocket coaxial with the small sprocket. The large sprocket is provided with an axially oriented recess in the bottom portion located between the first tooth and the second tooth of the large sprocket. The recess has a support curved face extending from the second tooth. The large sprocket is further provided with a support protrusion located under the support curved face such that the support protrusion is separated from the support curved face by a distance corresponding to about one tooth pitch. The support curved face and the support protrusion serve to support the inner and the outer chain plates of a drive chain at such time when the gearshifting takes place.

10 Claims, 9 Drawing Sheets

GEAR SHIFTING SPROCKET SET FOR BICYCLE CHAIN WHEEL

FIELD OF THE INVENTION

The present invention relates generally to a bicycle gear-shifting mechanism, and more particularly to a bicycle sprocket assembly of the bicycle gearshifting mechanism.

BACKGROUND OF THE INVENTION

The sprocket set structure of the conventional variable speed bicycle makes use of the conventional sprocket of the single speed bicycle, without taking into consideration the design of the chain shifting process. In other words, when the gear changing is under way, the sprocket chain engages the other sprocket in a random manner. As a result, the chance of success of gear changing of the conventional variable speed bicycle is relatively low. In the meantime, the speed changing process is slow while the operation feel is less smooth. In view of these drawbacks, various improvements in the sprocket structure of the variable speed bicycle have been made in the recent years in the hope that the engagement of the sprocket chain and the sprocket takes place successfully with precision when the bicycle gear changing is under way. The U.S. Pat. Nos. 5,085,621 and 5,087,226 disclose respectively a sprocket having the design of the slanted pocket of recess for averting the sprocket changing outer chain plate and for bracing the waist portion of the sprocket chain, so as to enhance the chance of success of gear changing. Another U.S. Pat. No. 5,192,248 discloses an invention making use of the reduction in the engaging tooth height of the deformed tooth or the affixed tooth. The fixed point gear changing is attained by means of the relay engagement of the intermediate teeth. The U.S. Pat. No. 5,413,534 discloses a gear changing path which is provided with a support projection for bracing the waist of the sprocket chain at the time when the gear changing takes place, thereby averting the chain shifting failure which is brought about by the fall of the sprocket chain before the chain has arrived at the engaging teeth.

The gear changing auxiliary structures described above have indeed greatly enhanced the rate of the gear-changing success. However, the gear-changing success is assured only when these structures and the links of the sprocket chain remain in a precise geometric relationship so as to enable the sprocket chain to complete the gear-changing action at the designed engagement position. Nevertheless, the sprocket chain is in itself an elastic and pliable transmission element such that the moving path and the precise position of each link are subject to change by the circumstance under which the sprocket chain is exerted on by the force, the contact condition and the external coordinated relationship of the sprocket. As a result, a specific geometric relationship can not be maintained between the sprocket chain links and the gear-changing auxiliary structures described above. In addition, the structure of the support sprocket plate waist is not compatible with the various sprocket chain waists made by various manufacturers. It is therefore readily apparent that the practical application of the above-mentioned gear-changing auxiliary structures is rather limited as far as the needs of the speed variable bicycle are concerned.

SUMMARY OF THE INVENTION

The primary objective of the present invention is to provide a bicycle sprocket wheel set of improving the gearshifting efficiency without a specific geometric relationship between the sprocket and the chain link.

Another objective of the present invention is to provide a bicycle sprocket wheel set capable of improving the gear-shifting efficiency regardless of the outer chain plate or the inner chain plate of the drive chain in the position of the auxiliary structure of sprockets when shifting.

In keeping with the principle of the present invention, the foregoing objectives of the present invention are attained by a bicycle sprocket wheel, which comprises a small sprocket and a large sprocket coaxial with the small sprocket. Located between the first tooth and the second tooth of the large sprocket is a recess, which is provided with a support curved face. The large sprocket is provided with a support protrusion. The inner chain plate and the outer chain plate of the drive chain are supported by the support curved face and the support protrusion so as to improve the gearshifting efficiency.

The foregoing objectives, features, and functions of the present invention will be more readily understood upon a thoughtful deliberation of the following detailed description of the embodiments of the present invention with reference to the accompanying drawings.

DETAILED DESCRIPTION OF THE INVENTION

Figure 1:
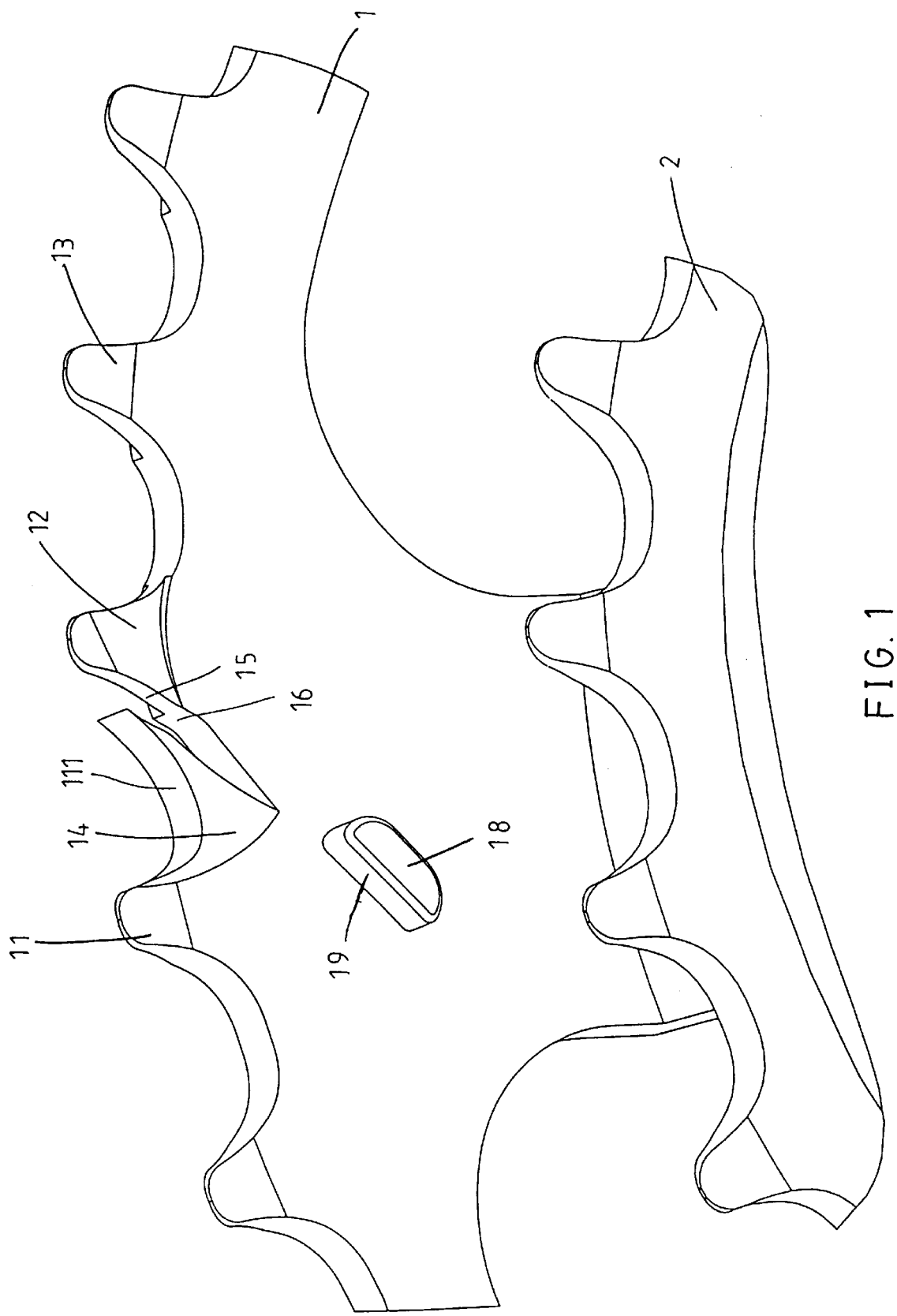
FIG. 1 shows a perspective view of a first preferred embodiment of the present invention.
Figure 2:
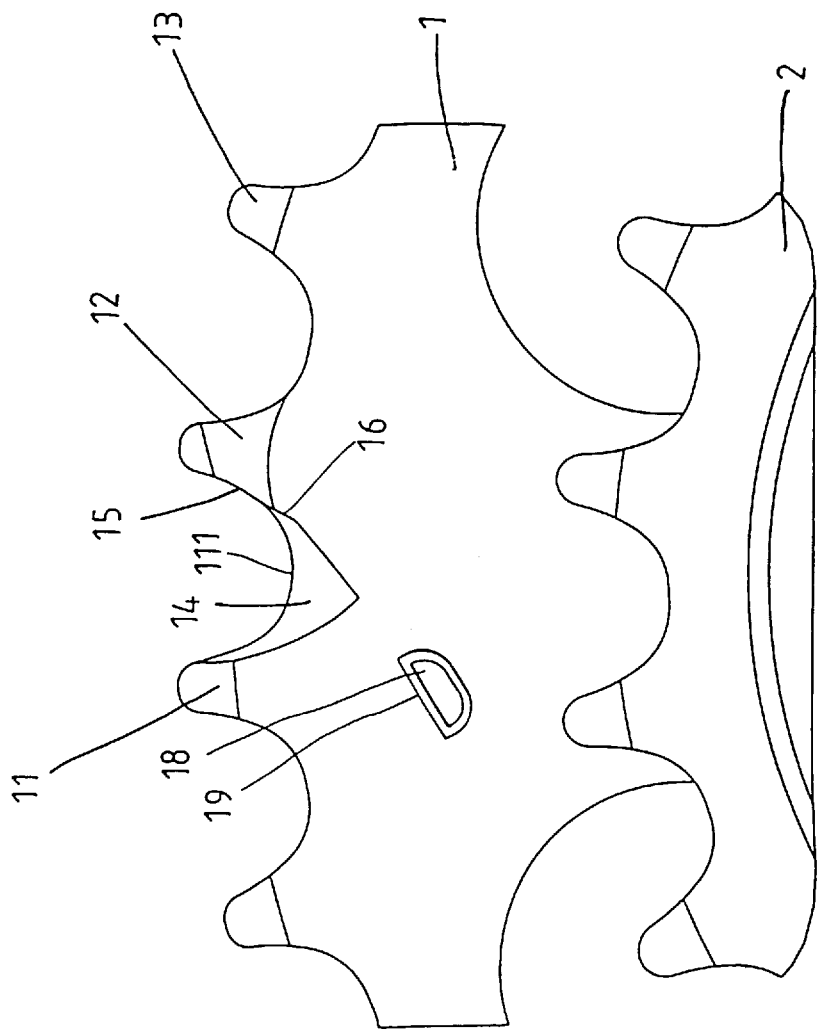
FIG. 2 shows a front view of the first preferred embodiment of the present invention.

As shown in FIGS. 1 and 2, a bicycle sprocket wheel set of the first preferred embodiment of the present invention is composed of a large sprocket 1, and a small sprocket 2.

The large sprocket 1 is coaxial with the small sprocket 2 and is provided with an axially oriented recess 14 located in a bottom 111 which is located between a first tooth 11 and a second tooth 12. The recess 14 is provided with a support curved face 16 extending from the bottom of a tooth belly 15 such that the support curved face 16 is contiguous to one side of the second tooth 12. The large sprocket 1 is further provided with a support protrusion 18 opposite to one side of the small sprocket 2, and a flat and smooth receiving strip 19 located under the support curved face 16 such that the receiving strip 19 is separated from the support curved face 16 by a distance of about one tooth pitch.

Figure 3:
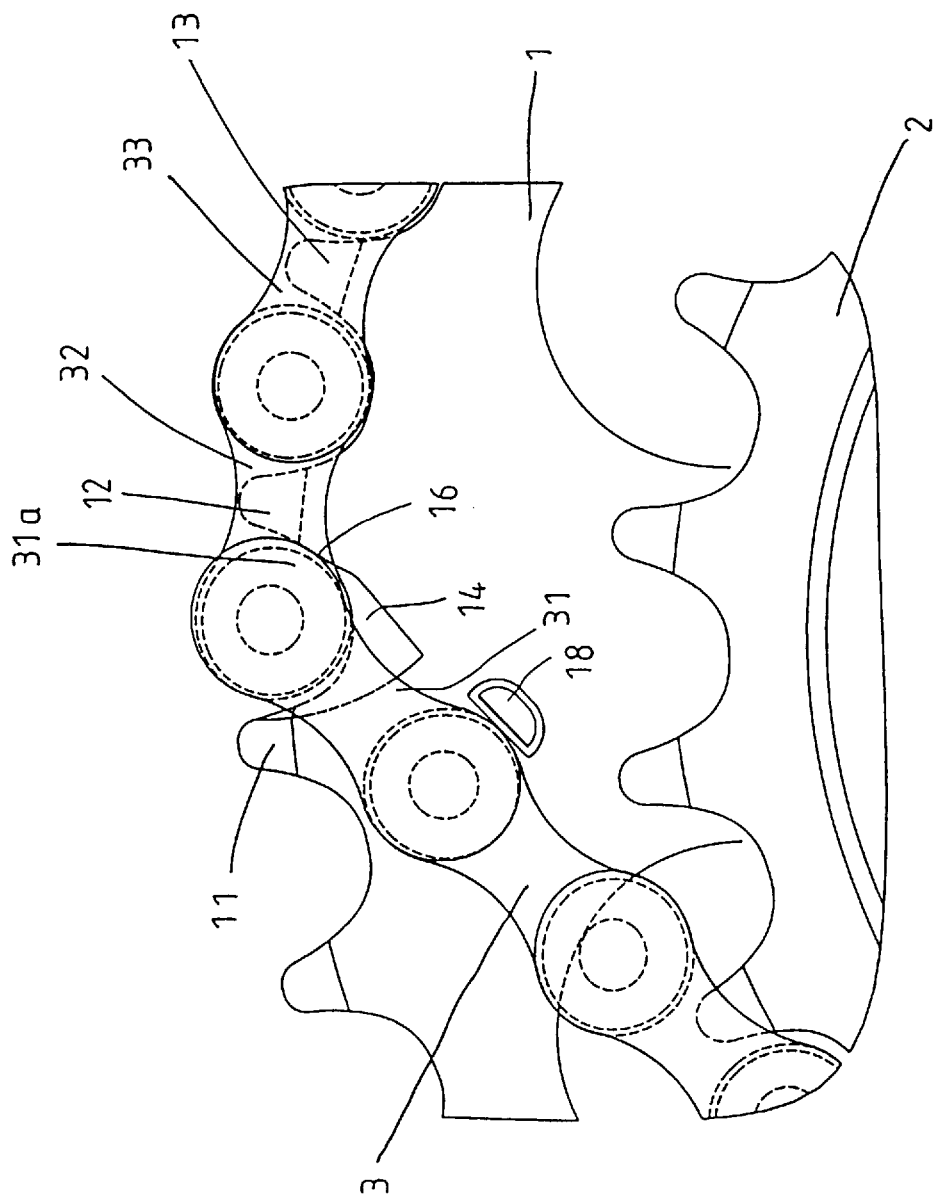
FIG. 3 shows a front view of a drive chain outer chain plate located at the gearshifting auxiliary structure of the first preferred embodiment of the present invention.
Figure 4:
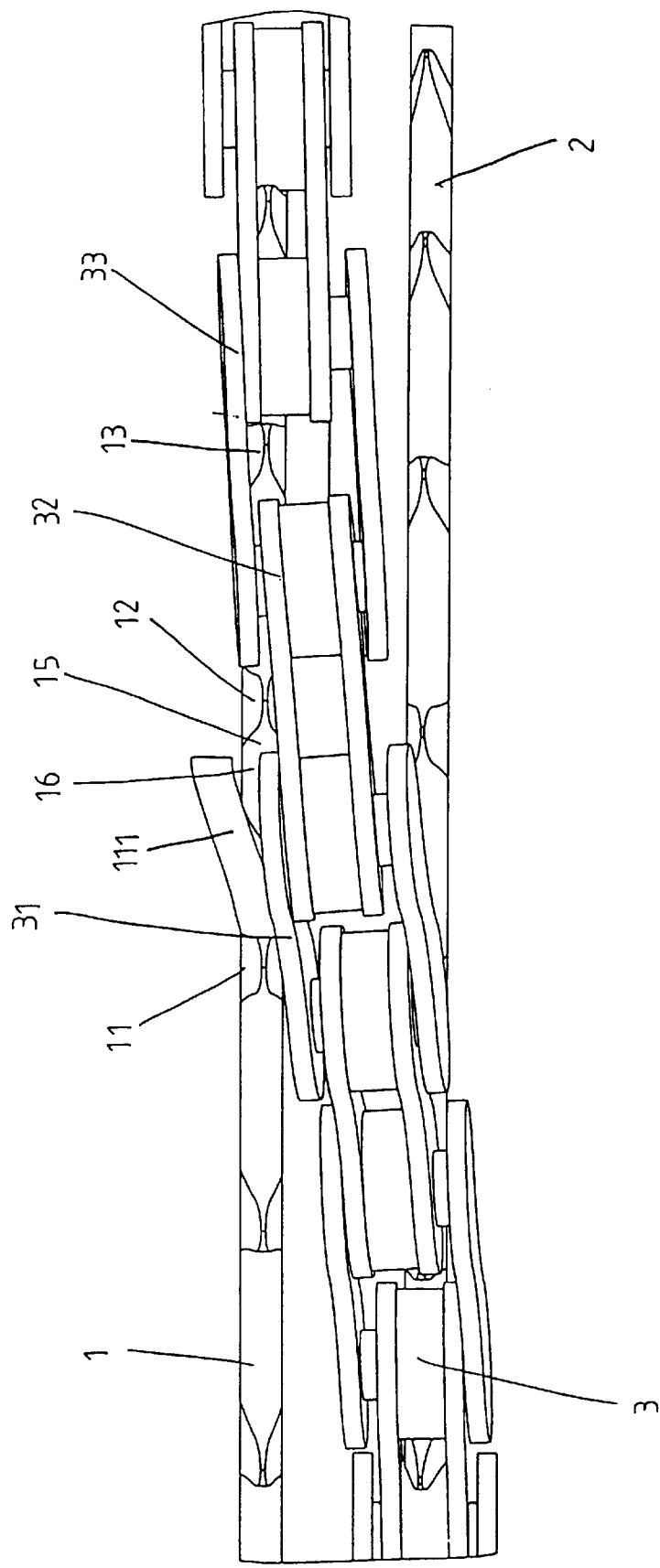
FIG. 4 is a top view of FIG. 3.

As illustrated in FIGS. 3 and 4, a drive chain 3 is engaged with the small sprocket 2. The drive chain 3 is actuated by a speed-changing mechanism (not shown in the drawings) to shift to the large sprocket 1 such that the drive chain 3 is provided with a support space by the recess 14, and that the chain plate of the drive chain 3 is rested against the support curved face 16 so as to enable the subsequent chain links to engage successfully with the large sprocket 1. In the event that an end portion 31a of a first outer chain plate 31 of one side of the drive chain 3 is supported by the support curved face 16 of the recess 14 during the gearshifting process, the inner chain plate 32 in front of the first outer chain plate 31 is located at the outer side of the second tooth 12 such that the inner chain plate 32 is slanted toward the second tooth 12, as shown in FIG. 4. As a result, the second outer chain plate 33 in front of the inner chain plate 32 is capable of engaging successfully a third tooth 13 of the large sprocket 1. Accordingly, the subsequent chain links are capable of engaging successfully the large sprocket 1 so as to bring about a successful gearshifting process.

Figure 5:
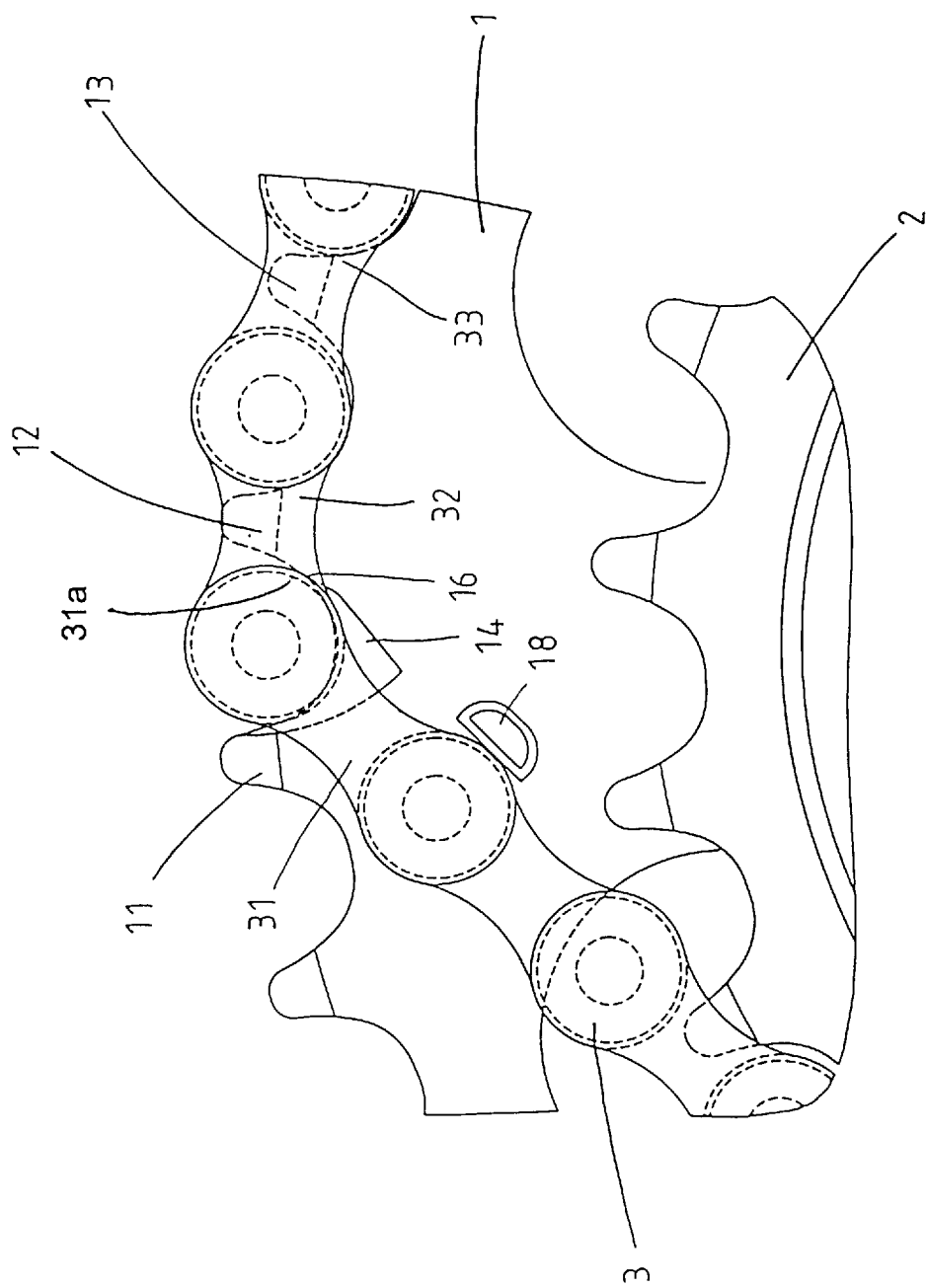
FIG. 5 shows another front view of the drive chain outer chain plate located at the gearshifting auxiliary structure of the first preferred embodiment of the present invention.

As shown in FIG. 5, the end portion 31a of the first outer chain plate 31 of the drive chain 3 is supported on the middle or the lower portion of the support curved face 16, the drive chain 3 is still effectively supported to bring about a successful gearshifting. It is therefore readily apparent that the precise geometric relationships between the chain links and the sprockets are not prerequisite for the successful gearshifting.

Figure 6:
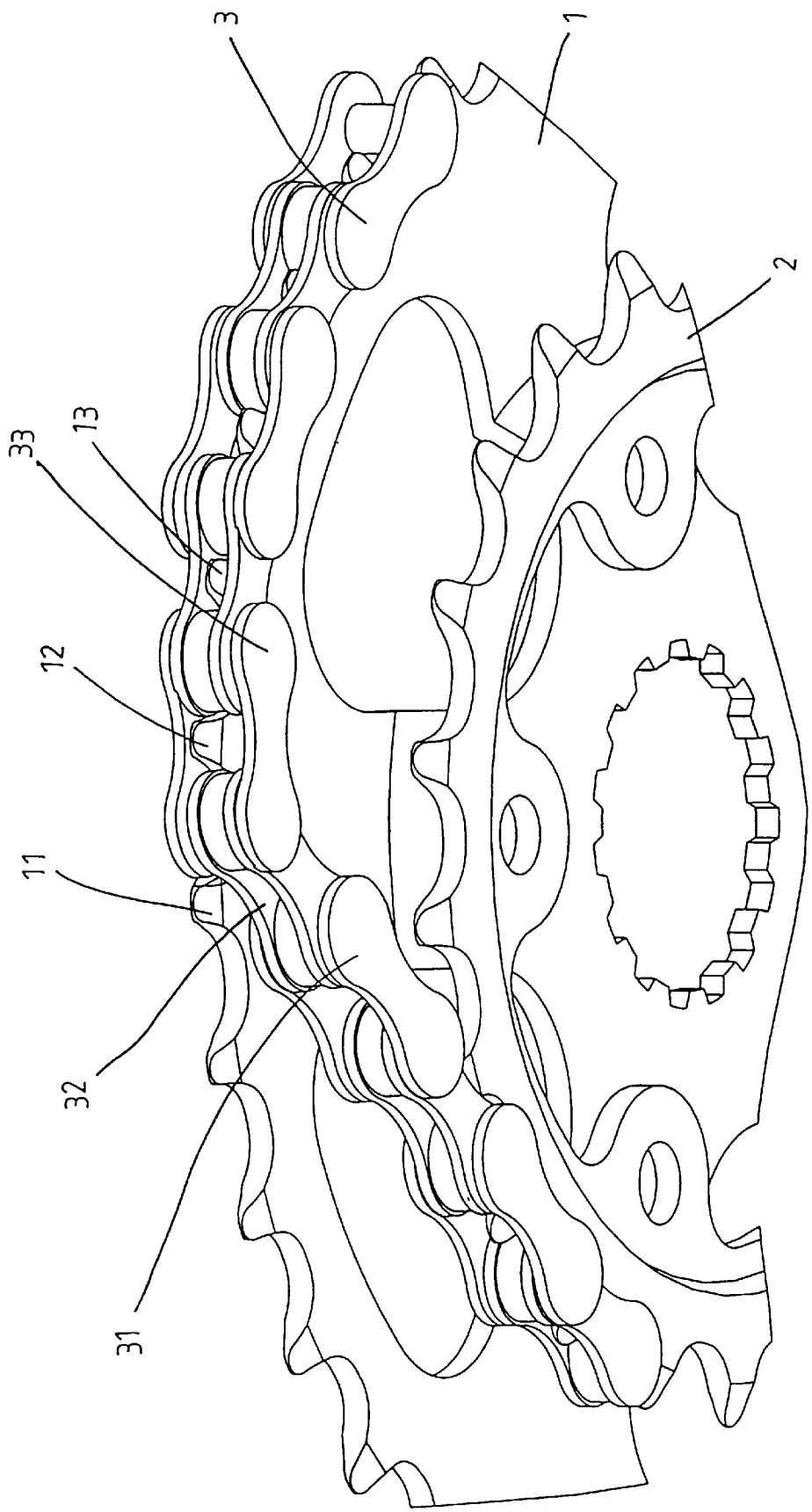
FIG. 6 is a schematic view showing the engagement of a bicycle drive chain with the sprocket wheel.
Figure 7:
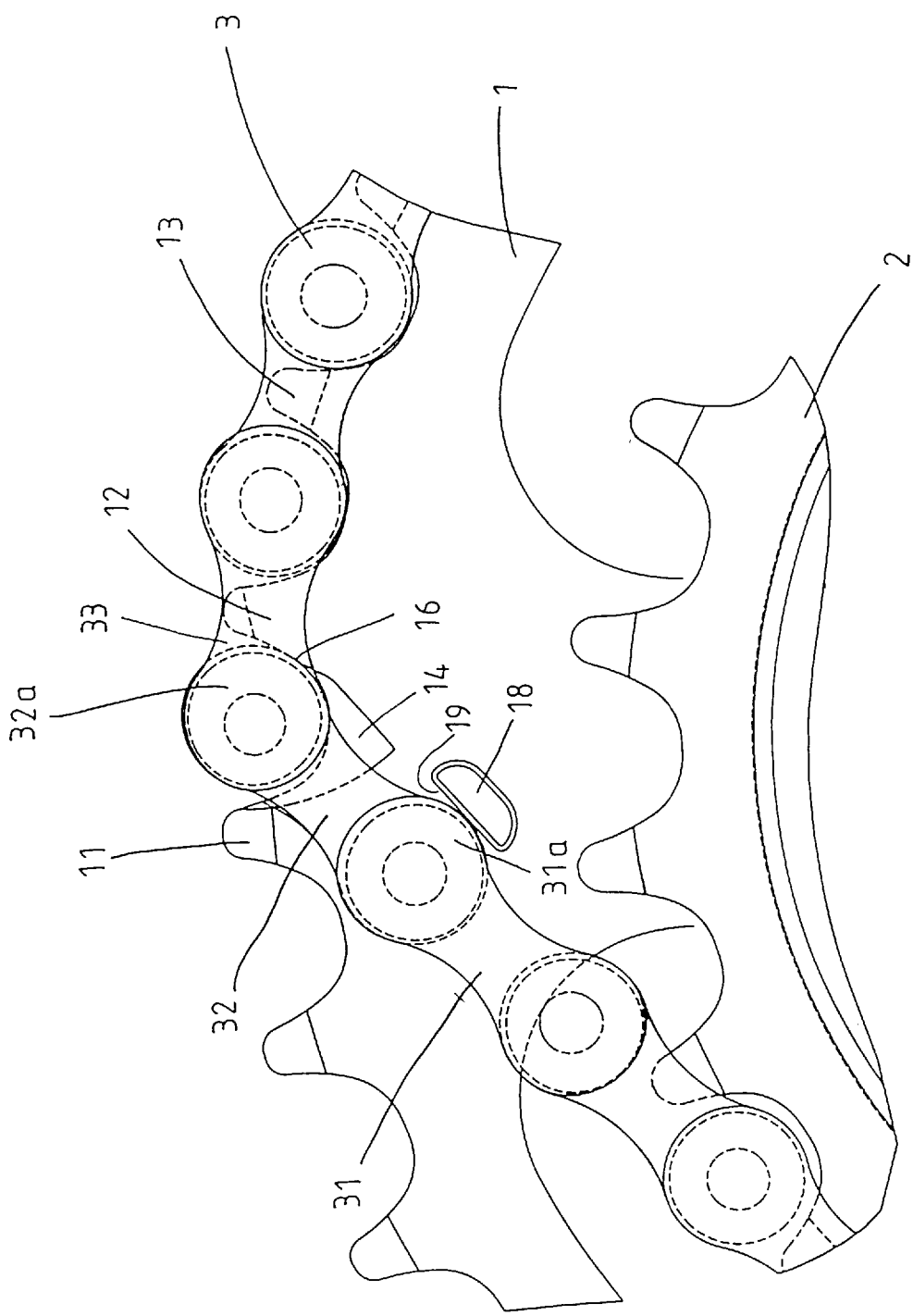
FIG. 7 shows a front view of a drive chain inner chain plate located at the gearshifting auxiliary structure of the first preferred embodiment of the present invention.
Figure 8:
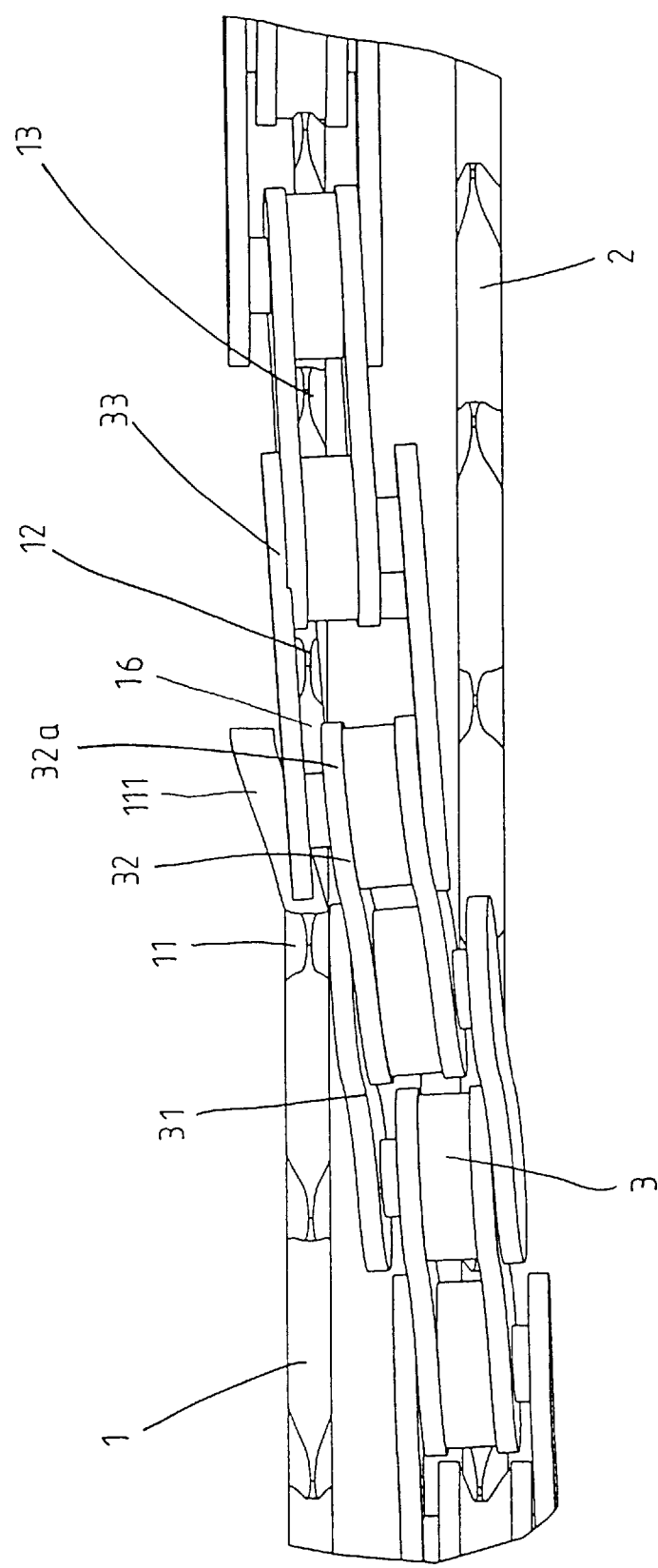
FIG. 8 is a top view of FIG. 7.

As shown in FIG. 6, the drive chain consists of inner chain links and outer chain links, which are arranged in an alternating manner. For this reason, it is likely that the first outer chain plate 31 is not in contact with the support curved face 16 during the gearshifting. As shown in FIGS. 7 and 8, when the above situation takes place, the end portion 31a of the first outer chain plate 31 is located on the receiving strip 19 of the support protrusion 18. In the meantime, the end portion 32a of the inner chain plate 32 is located on the support curved face 16 so as to enable the second outer chain plate 33 to engage the second tooth 12 of the large sprocket 1, and so do the subsequent chain links.

Figure 9:
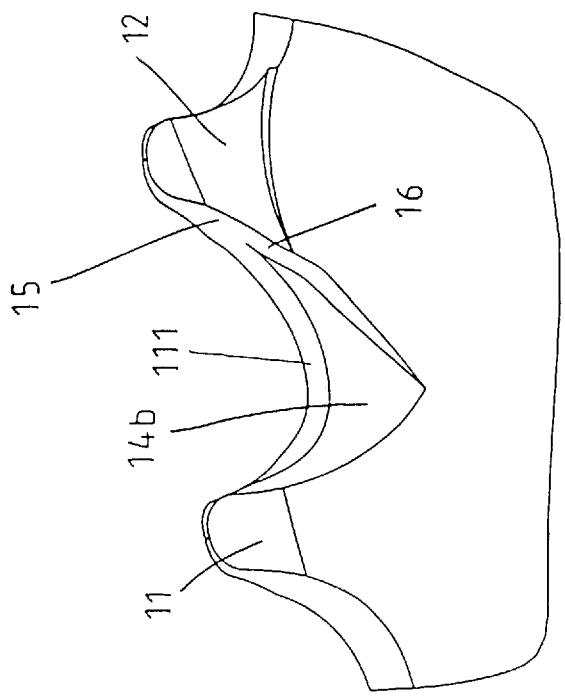
FIG. 9 shows a perspective view of a second preferred embodiment of the present invention.
Figure 10:
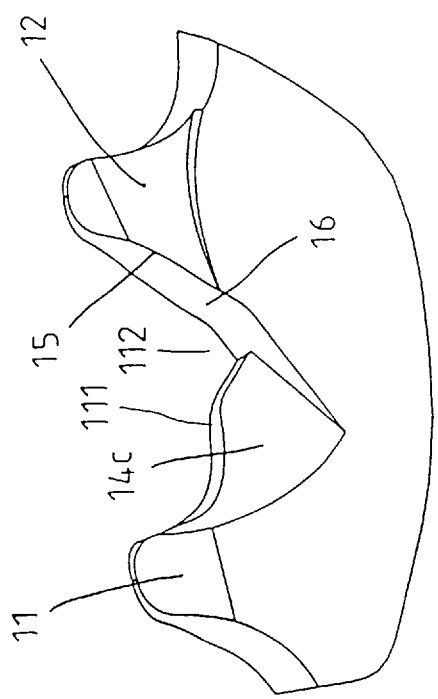
FIG. 10 shows a perspective view of a third preferred embodiment of the present invention.

It must be noted here that the recess 14 is formed by punching such that the recess 14 has a depth greater than the thickness of the bottom 111. However, as shown in FIG. 9, a recess 14b is provided with a support curved face 16 having a width (corresponding to the depth of the recess 14b) slightly smaller than the thickness of the bottom 111 located between the first tooth 11 and the second tooth 12. As a result, the chain plates of the drive chain do not cause an interference at the recess 14b. Moreover, as shown in FIG. 10, the left lower half portion of the bottom 111 is provided with a recess 14c by punching while the right upper half portion 112 of the bottom 111 is punched completely to form the support curved face 16, which has a width greater than the depth of the recess 14c. Both sides of the second tooth 12 and the third tooth 13 may be so trimmed as to improve the engagement efficiency of the drive chain and the sprockets.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A bicycle sprocket set for gearshifting mechanism, comprising:

a small sprocket;

a large sprocket arranged coaxially with said small sprocket, said large sprocket having a first tooth, a second tooth, and a bottom portion interposed between said first tooth and said second tooth, said large sprocket also having a slanted recess defining a three-sided, substantially planar surface, joining said first tooth on one side, joining said bottom portion on a second side, and defining a curved support surface on a third side, said three-sided surface slanted radially outwardly from said small sprocket, said curved support surface extending from said second tooth toward said first tooth;

a support protrusion attached on said large sprocket and facing said small sprocket; and a drive chain adapted for shifting engagement between said small sprocket and said large sprocket so that, during sprocket shifting, said drive chain climbs from said support protrusion onto said curved support surface along said slanted recess.

2. The bicycle sprocket set of claim 1, wherein said drive chain comprises a plurality of alternating inner chain plates and outer chain plates and said support protrusion has a substantially flat top surface, said support protrusion is spaced from said curved support surface by a distance of about one tooth pitch for supporting either one of said inner chain plate or said outer chain plate.

3. The bicycle sprocket set of claim 1, wherein said slanted recess has a depth in a radial direction, said large sprocket has a thickness in an axial direction, and said slanted recess is punched out and disconnected from said curved support surface of said large sprocket, and said depth of said slanted recess is greater than said thickness of said large sprocket, so that during sprocket shifting, said drive chain clears and does not interfere with said large sprocket at said slanted recess.

4. The bicycle sprocket set of claim 1, wherein a thickness of said curved support surface in an axial direction is less than a thickness of said bottom portion in an axial direction, so that during sprocket shifting, said drive chain clears and does not interfere with said large sprocket at said slanted recess.

5. The bicycle sprocket set of claim 1, wherein said slanted recess has a shortened third side joining with said curved support surface, so that during sprocket shifting, said drive chain clears and does not interfere with said large sprocket at said slanted recess.

6. A large sprocket of a gearshifting mechanism for use in combination with a small sprocket and a drive chain of a bicycle, the drive chain being composed of a plurality of alternating inner chain plates and outer chain plates, the large sprocket comprising:

a first tooth, a second tooth, and a bottom portion interposed between said first tooth and said second tooth;

a slanted recess defining a three-sided, substantially planar surface, joining said first tooth on one side, joining said bottom portion on a second side, and defining a curved support surface on a third side, said three-sided surface slanted radially outwardly from said small sprocket, said curved support surface extending from said second tooth toward said first tooth; and a support protrusion attached on said large sprocket and facing said small sprocket, said support protrusion spaced from said curved support surface by a distance of about one tooth pitch;

wherein during sprocket shifting, either one of said inner chain plate and said outer chain plate of said drive chain climbs from said support protrusion onto said curved support surface along said slanted recess.

7. The bicycle sprocket set of claim 6, wherein said support protrusion has a substantially flat top surface for supporting either one of said inner chain plate or said outer chain plate.

8. The bicycle sprocket set of claim 6, wherein said slanted recess has a depth in a radial direction, said large sprocket has a thickness in an axial direction, and said slanted recess is punched out and disconnected from said curved support surface of said large sprocket, and said depth of said slanted recess is greater than said thickness of said large sprocket, so that during sprocket shifting, said drive chain clears and does not interfere with said large sprocket at said slanted recess.

9. The bicycle sprocket set of claim 6, wherein a thickness of said curved support surface in an axial direction is less than a thickness of said bottom portion in an axial direction, so that during sprocket shifting, said drive chain clears and does not interfere with said large sprocket at said slanted recess.

10. The bicycle sprocket set of claim 6, wherein said slanted recess has a shortened third side joining with said curved support surface, so that during sprocket shifting, said drive chain clears and does not interfere with said large sprocket at said slanted recess.

\* \* \* \* \*

UNITED STATES PATENT AND TRADEMARK OFFICE
CERTIFICATE OF CORRECTION

PATENT NO. : 5,876,296
DATED : March 2, 1999
INVENTOR(S) : Pai-Hsiang Hsu et al.

It is certified that error appears in the above-identified patent and that said Letters Patent is hereby corrected as shown below:

On the title page, Item [73], line 2, the country name should read "Taiwan, Republic of China", not --Taiwan, China--.

Signed and Sealed this

Thirteenth Day of July, 1999

Attest:

Q. TODD DICKINSON

Attesting Officer

Acting Commissioner of Patents and Trademarks